July 6, 1937. A. H. NEULAND 2,085,763

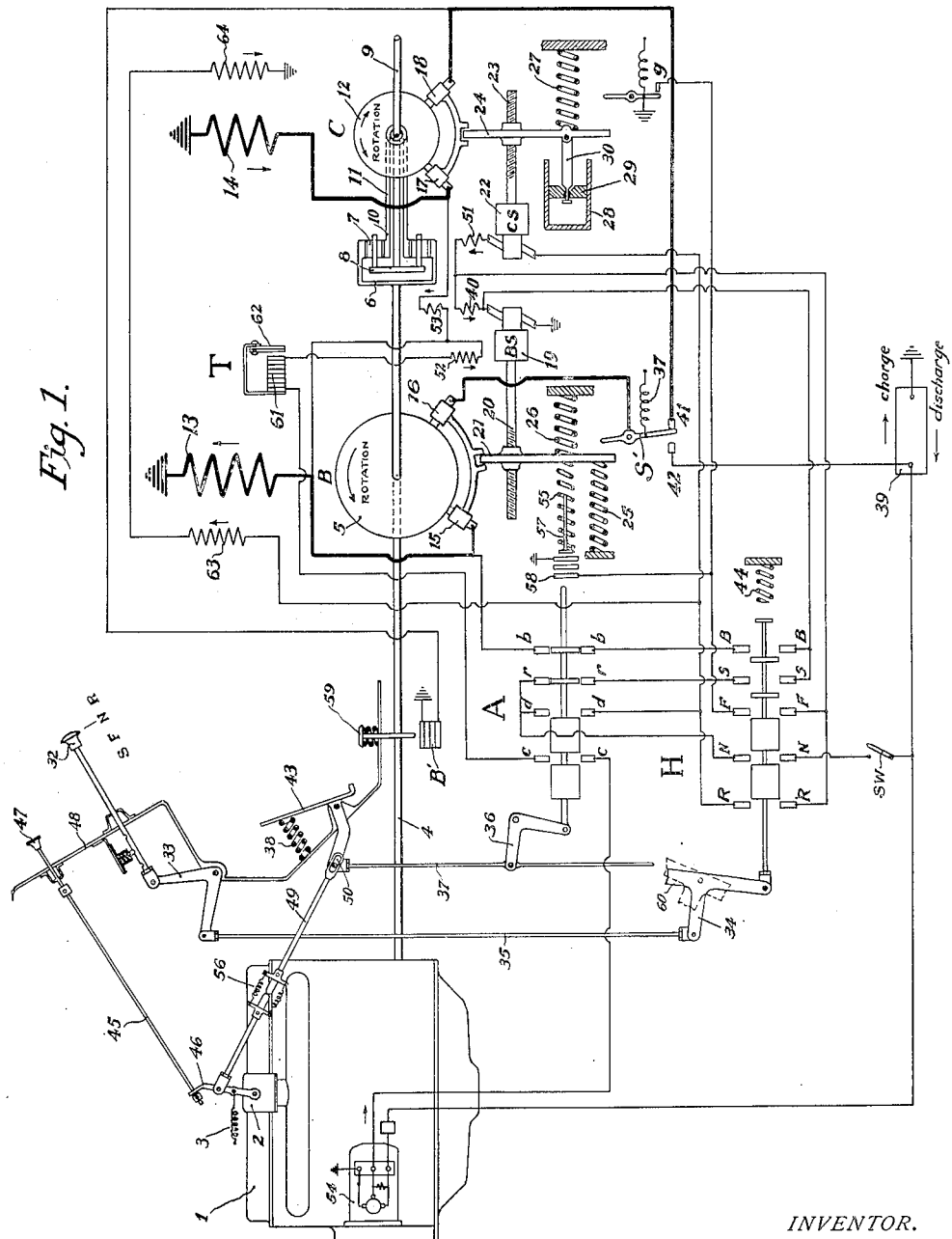

TRANSMISSION SYSTEM AND CONTROLS THEREFOR

Filed Aug. 14, 1934 3 Sheets-Sheet 2

*Fig. 2.*
ACCELERATOR RELEASED

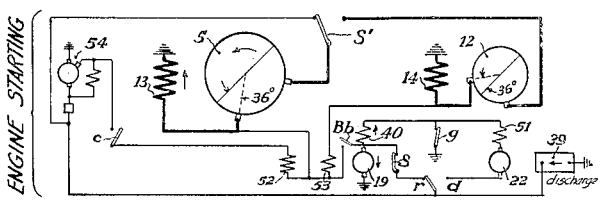

*Fig. 3.*
ACCELERATOR SLIGHTLY DEPRESSED

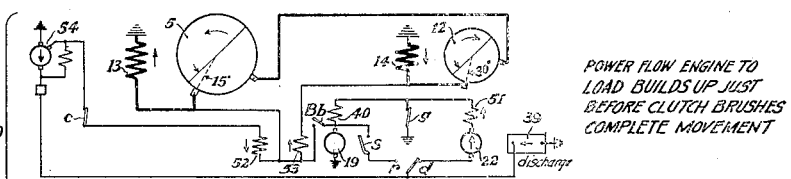

POWER FLOW ENGINE TO LOAD BUILDS UP JUST BEFORE CLUTCH BRUSHES COMPLETE MOVEMENT

*Fig. 4.*
ACCELERATOR DEPRESSED

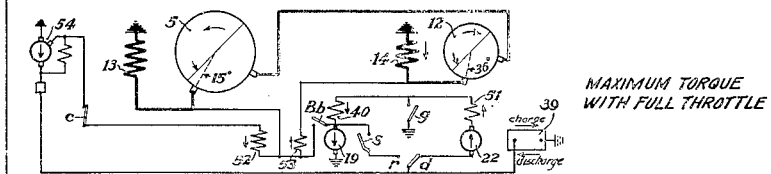

MAXIMUM TORQUE WITH FULL THROTTLE

*Fig. 5.*
ACCELERATOR DEPRESSED

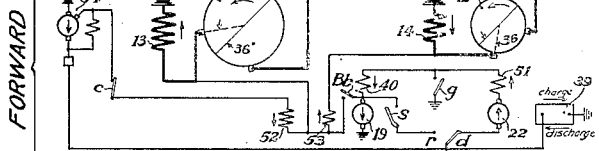

HIGH LOAD SPEED WITH MODERATE ENGINE SPEED

*Fig. 6.*
ACCELERATOR DEPRESSED BEYOND FULL THROTTLE

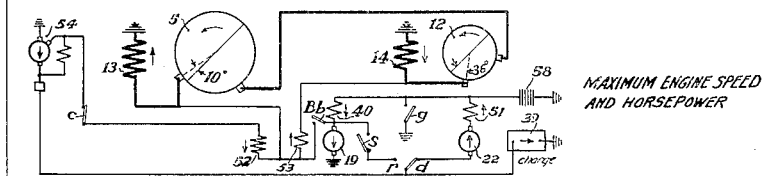

MAXIMUM ENGINE SPEED AND HORSEPOWER

*Fig. 7.*
ACCELERATOR RELEASED

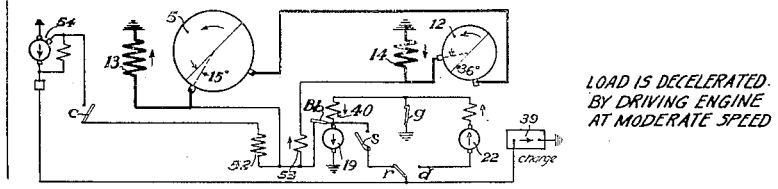

LOAD IS DECELERATED BY DRIVING ENGINE AT MODERATE SPEED

*INVENTOR.*
ALFONS H. NEULAND
BY Ralph B. Stewart
ATTORNEY.

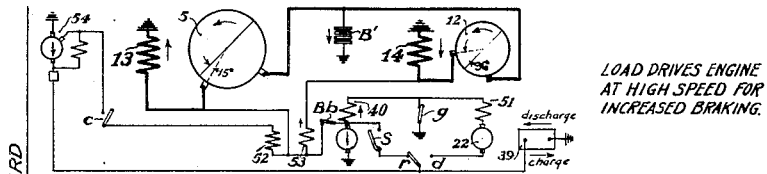

Fig. 8.
ACCELERATOR RELEASED

LOAD DRIVES ENGINE AT HIGH SPEED FOR INCREASED BRAKING.

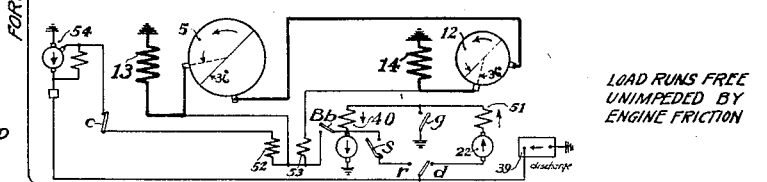

Fig. 9.
ACCELERATOR SLIGHTLY DEPRESSED

LOAD RUNS FREE UNIMPEDED BY ENGINE FRICTION

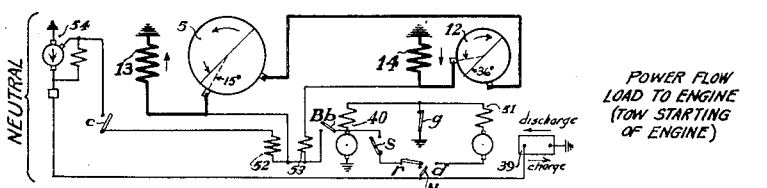

Fig. 10.
ACCELERATOR RELEASED (OR DEPRESSED)

POWER FLOW LOAD TO ENGINE (TOW STARTING OF ENGINE)

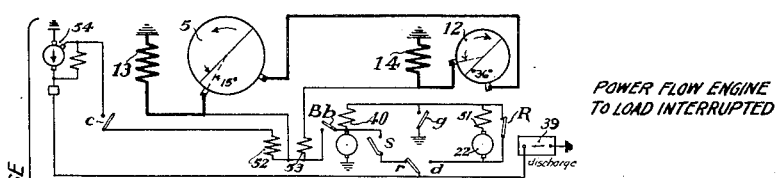

Fig. 11.
ACCELERATOR RELEASED

POWER FLOW ENGINE TO LOAD INTERRUPTED

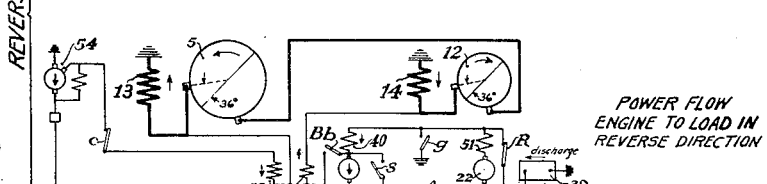

Fig. 12.
ACCELERATOR DEPRESSED

POWER FLOW ENGINE TO LOAD IN REVERSE DIRECTION

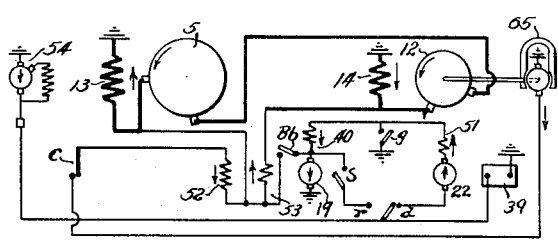

Fig. 13.

INVENTOR.
ALFONS H. NEULAND
BY Ralph B. Stewart
ATTORNEY.

Patented July 6, 1937

2,085,763

UNITED STATES PATENT OFFICE 2,085,763

TRANSMISSION SYSTEM AND CONTROLS THEREFOR

Alfons H. Neuland, Irvington, N. J.

Application August 14, 1934, Serial No. 739,838

46 Claims. (Cl. 290—17)

My present invention relates to improved methods and means for transmitting power from a power source to a load and for variously operating and controlling the power source and the load.

More specifically, my invention relates to a transmission system particularly suited to motor vehicles, rail cars and the like, using an internal combustion engine as the source of power.

The present invention is related to my copending application for Electric system, gearing and control for motor vehicles, Serial No. 359,031, filed April 29, 1929, in which I have disclosed an electric transmission system in which an automatic change of the speed and torque ratio between power and load shafts is secured by shifting the brushes of one of the electric units in response to load changes and changes in the speed of one of the shafts, and in which the friction of the internal combustion engine is made use of to decelerate the load.

My present invention is particularly directed to and has as its object the provision of brush shifting means and control for both electric main units and the establishment of certain relations and adjustments between the throttle of an engine, a foot accelerator pedal, and a hand operated throttle control whereby the speed of the engine may be varied by the hand throttle within fixed limits without moving the load and whereby power from the engine to load may be applied and interrupted by a slight movement of the foot accelerator pedal without necessarily changing the throttle opening.

Another object is to provide a means for holding the brushes of one of the units in a position to start or to drive the engine by a forward movement of the vehicle when the accelerator is in one position and to shift the brushes to permit free running of the vehicle unimpeded by engine drag or friction when the accelerator is moved to another position.

Still another object is to provide improved means for shifting the brushes of one of the dynamos in response to speed and load changes and a means for shifting the brushes in response to movement of the accelerator pedal and for modifying or varying the brush shift responsiveness due to speed and load changes.

Still another object is to provide a controlling means for operating the load shaft in forward and reverse directions and cooperation between the controlling means and the accelerator pedal whereby when the control lever is moved into forward or reverse the vehicle will not move until the accelerator pedal is depressed.

A further object is to provide a means for moving the brushes of one of the units into position of a greater motoring effectiveness when the apparatus is used for starting the engine from a storage battery, and also to provide cooperation between the brush shifting means and the accelerator pedal to prevent completion of the battery starting circuit unless the accelerator pedal is in its releaed position.

Still another object is to provide temperature operated means for reducing the effect of temperature changes upon the automatic control.

Still another object is to provide a means for movement of the brushes in response to movement of the accelerator pedal beyond full throttle position when the control switch is in forward position and to prevent such movement when the control switch is in reverse position.

Other objects and advantages of my improved system will appear from the following detailed description and from the appended drawings showing a preferred embodiment of my invention which I have selected for illustration, and in which:

Figure 1 is a schematic representation of my system showing the mechanical and electrical elements, their arrangement one with respect to the others, including the electrical connections and controls.

Figures 2 to 12 inclusive are simplified diagrams showing the circuits which are established and the position which the brushes occupy, or move into, with the controller and the accelerator pedal in various positions.

Figure 13 is a simplified diagram of a modified embodiment of my system in one stage of operation.

Referring to the figures, the transmission system consists of an internal combustion engine 1, a throttle 2 normally held in nearly a closed or idling position by means of a spring 3. The engine shaft 4 is connected in fixed speed relation with the armature 5 of a dynamo B, which will hereafter also be referred to as the booster dynamo. The engine shaft is also connected with a sun gear 6 of an epicyclic gear train G, meshing with the planet gear 7 carried by a spider 8 which in turn is connected to a propeller or load shaft 9. A dynamo armature 12, of a second power dynamo C, which will hereafter also be referred to as the clutch dynamo, is connected in variable speed relation with respect to engine and propeller shaft by means of a sleeve 11 and a small sun gear 10 connected to and meshing with the planet gear 7. The booster and clutch dynamos are each provided with series field coils 13 and 14 respectively. The constructional details of this system have been fully described in my copending application Serial No. 359,031, filed April 29, 1929 and Serial No. 508,094, filed January 12, 1931. Commutators of the booster and clutch armatures 5 and 12 are each provided with a plurality of movable brushes, 15 and 16, and 17 and 18 respectively, arranged to be shifted approximately 140 electrical degrees for the purpose of varying the terminal voltage of either machine and so to vary the speed and torque relationship between the power and load shafts. Brush shifting within wide limits under the pole without objectionable sparking at the brushes is made possible by the establishment of a neutral zone of substantially no flux at the point of commutation. This feature is also described in detail in my copending application, Serial No. 359,031, filed April 29, 1929.

A small motor BS is provided for shifting the booster brushes to various positions comprising an armature 19 and means such as a threaded shaft 20 and a movable arm 21 for imparting movement to the booster brushes in either direction according to the direction of the rotation of the armature 19. The clutch brushes are also arranged to be shifted by means of a small control motor CS having an armature 22, and a threaded shaft 23 engaging with the movable arm 24.

I provide retractile means such as a spring 25 to normally hold the booster brushes in the direction of the engine rotation against the tension of a relatively strong spring 26 which also serves as a stop and permits the spring 25 to hold the booster brushes in a predetermined motoring position. I provide a spring 27 for biasing the clutch brushes into a position opposed to the direction of engine rotation so the clutch will operate as a series generator when driven by the load shaft. A dashpot, consisting of the cylinder 28 and the piston 29 provided with a valve stem 30 which closes whenever the spring 27 operates to return the brushes to their normal position, serves to check any too sudden return of the brushes into generating position under certain conditions of operation, and thereby limits the current in the load circuit, and so prevents shock to the system.

It will be understood that screws 20 and 23 are provided with threads of suitable pitch to render the screws reversible, that is, so that the pressure of the biasing springs upon members 21 and 24 will cause the screws to rotate and permit the brushes to move to the biased positions. The particular brush-shifting arrangements shown are for the purpose of illustration only; other arrangements will occur to those skilled in the art. For example, the pinion and sector-gear arrangement shown in my copending application Ser. No. 359,031 could be used in the present system if desired.

The load circuit, shown by the heavy line, includes the booster and clutch armatures and their series field coils 13 and 14 and is normally completed by the starting switch S' held in the closed position by the spring 37.

My system provides for auxiliary control circuits and includes a switch A, arranged to be operated by movement of the accelerator pedal through the bell-crank 36 and the rod 37, and a switch H, having start, forward, neutral, and reverse positions, arranged to be manually operated by some means such as a push-pull control 32 on the dash of the vehicle and connected with the switch through the bell-cranks 33 and 34 and the rod 35.

Switch A is so constructed that contacts $c$—$c$ and $d$—$d$ are open when the accelerator is in released position, but are closed by the initial movement of the accelerator and remain closed throughout the remaining range of accelerator movement. Contacts $r$—$r$ and $b$—$b$ are closed only when the accelerator is in fully released position.

Switch H is shown in "neutral" position where all contacts are open. In the "reverse" position only contacts R—R and N—N are closed. In the "forward" position, contacts N—N, F—F, and B—B are closed, the movement being insufficient to close contacts S—S. Upon movement from the "forward" to the "start" position, contact B—B is broken, contact S—S is completed and contacts N—N and F—F remain completed.

The various connections established by the switches A and H, the resulting circuits and the operation of the brush shifting motors BS and CS as well as the position which the brushes assume will hereafter be described in detail in connection with simplified circuit diagrams shown in Figures 2 to 12 inclusive.

In the simplified circuits, where a switch serves the function of contacts on switches A and/or H, it is designated by a single reference character of the corresponding contacts.

*Engine starting*

To start the engine the control button 32 is pushed all the way down into starting position S, closing the contacts N—N, F—F, and S—S of switch H and establishing the connections shown in Fig. 2, as long as the accelerator 43 remains in the released position held by the spring 38, when the switches $r$—$r$ and $b$—$b$ are closed and $c$—$c$ and $d$—$d$ are open. The switch SW is also closed to supply current to the control circuits from battery 39. This switch is for the purpose of disconnecting the battery from the control circuits when the car is not in operation. The current from the battery 39 flows through the switches N—N, $r$—$r$ and S—S, to the junction point of motor armature 19 and its field coil 40, a portion of the current traversing armature 19 and returning to the battery through the grounds shown and another portion traversing the field coil 40 in reverse direction and returning to the battery through contacts F—F and the ground switch $g$. The motor BS is thereby made to rotate in a direction to shift the booster brushes in direction of engine rotation to a position of strong motoring operation, whereby the motor torque of the booster is substantially increased, and as the member 21 moves to the right the spring 26 is compressed, the switch S' opens the contact block 41 and closes the contact block 42, disconnecting the booster from the clutch and connecting it with the battery 39. Current from the battery now traverses the booster armature and field by way of the ground connections shown, and the vigorous rotation of the booster armature starts the engine. I provide a spring 44 for the switch H which operates to open the starting circuit and bias the switch H into the forward operating position whenever the operator releases pressure upon the control button 32. This serves as a safeguard against any unnecessary drain upon the battery. It should be noted that in order to start the engine the accelerator pedal 43 must be in its released position, as a depression of the accelerator pedal will open the switch r—r and prevent the flow of current through the auxiliary, as well as the main booster circuits. This feature of my system prevents drain upon the battery which may be caused if for any reason the control lever 32 remains in starting position. I also provide means for varying the throttle opening independently of the accelerator pedal 43, such as a rod 45 connecting the throttle lever 46 with the throttle control button 47 which may conveniently be located on the dash 48 of the vehicle. The throttle lever 46 is also connected to the accelerator pedal 43 by means of the rod 49, the lower end of which is provided with a slot 50 which permits a limited variation in the throttle opening by movement of the control button 47 without affecting the position of the accelerator switch A.

It is not necessary that the switch S' open the load circuit for starting the engine. The load circuit may remain closed at all times and the switch S' would then supply current to the booster and clutch in parallel, both machines supplying torque tending to drive the engine in forward direction. Since the torque capacity of the booster is sufficient for starting the engine, I prefer to disconnect the clutch during starting in order to avoid heavy current drain on the battery.

*Forward*

After the engine has started and the operator releases pressure upon the control button 32, spring 44 biases the control switch H into the forward position F where the contacts N—N, F—F, and B—B are closed and the contacts R—R and S—S are open. This interrupts current flow through brush shift motor BS and permits the spring 26 to return the booster brushes into their normal spring held motoring position. Even though the engine rotates, power flow from the engine to the propeller is interrupted as long as the accelerator pedal 43 is in its released position and the switch d—d is open, when no current flows through the brush shift motor CS, which permits the spring 27 to hold the clutch brushes in position opposed to engine rotation. In this position of the clutch brushes, the series field 14 is connected for motoring operation when the clutch armature is rotated in opposition to engine rotation through the differential gear train G. Consequently, the system can not build up and no power can be transmitted to the load shaft.

To start the car, the accelerator pedal 43 is slightly depressed. The slot 50 permits the switch A to be operated without necessarily increasing the throttle opening. This slight movement suffices to open the switches b—b and r—r and to close switches c—c and d—d, establishing the circuit connections shown in Fig. 3. Current from the battery 39 now flows through motor armature 22 and field 51 and through the ground switch g back to the battery 39. The entire potential of the battery is impressed upon the brush shift motor CS which now operates as a series motor and rapidly shifts the clutch brushes into generating position in the direction of engine rotation against the force of the spring 27. The dashpot at this moment does not impede the rapid movement of the clutch brushes into generating position, since the valve stem 30 pulls away from the piston and permits air to enter the cylinder 28.

The total range of brush movement in the booster and clutch units should not exceed the pole face arc in order that the brushes shall remain within the neutralized zone established by the series field coils. In the drawings I have shown the booster and clutch units having four poles and a total brush shift of 144 electrical degrees corresponding to 72 electrical degrees, or 36 mechanical degrees, from the center of the pole in each direction. For the sake of convenience it is assumed that the end connections of the armature are so arranged that when the point of maximum armature magneto-motive-force is aligned with the center of the pole arc the brushes are also aligned with the center of the pole arc. This position corresponds to zero voltage at the brush terminals and will for the purpose of the present description be designated and referred to as the neutral point, as distinguished from the neutral point which is usually associated with the brushes in position of maximum voltage.

I prefer to hold the clutch brushes in one or the other extreme position during all conditions of operation, that is, to hold them in a position opposed to engine rotation again a stop, not shown, by some retractile means such as the spring 27 and to move them in the direction of engine rotation to the other extreme position against another stop by some means capable of overcoming the force of the retractile means in response to the movement of the accelerator pedal such as the brush shift motor CS. The spring held position of the booster brushes depends upon the relative size of the booster and clutch units, the gear ratio in the gear train G, the torque increase desired at the load shaft over that supplied by the engine, as well as upon the engine speed at which it is desired to develop the maximum torque. In Fig. 1, I have shown a gear train in which the sun gears have a 2–1 ratio and a booster unit substantially physically larger than the clutch unit, the purpose of which has been described in my copending applications heretofore mentioned. In the drawings I have shown the booster brushes, spring held, 15 mechanical degrees in motoring position, that is, 15 mechanical degrees from the neutral or pole center, in the direction of engine rotation. The booster brushes remain in this position as long as the booster brush shift motor BS is inactive. When the accelerator pedal 43 is slightly depressed, the clutch brushes move in opposition to engine rotation as heretofore described. They pass from the motoring zone into the generating zone and, as they approach their extreme generating position, the clutch unit builds up and sends a current through the load circuit. Inasmuch as the speed of the brush-shift can be adjusted either by the spring 27 or the brush shift motor CS, the rate at which the current builds up can be adjusted to the desired value and so as to prevent a too sudden application of power to the load shaft, even though the idling speed of the engine happens to be higher than is necessary. The purpose of biasing the booster brushes to a weakened motoring position is to lower the counter-electromotive-force of the booster, which results in a larger current flow in the load circuit and a corresponding increase of torque during the first stage of forward operation.

*Forward underdrive and overdrive*

As the clutch brushes complete their movement, the movable arm 24 opens the ground switch g, Fig. 1, connecting both brush-shift motors in series with one another. The force of the spring 25 is preferably made to equal the force developed by the brush-shift motor BS at this moment so that even though current flows through motor BS the booster brushes will remain in their motoring position. The current generated by the clutch unit traverses the booster unit operating it as a motor; the motoring torque developed by the booster armature combines with the torque developed by the engine, which in combination with the torque reaction supplied by the clutch armature through the small sun gear 10, exerts a torque upon the load shaft 9 greatly in excess of the torque ability of the engine. As the accelerator is further depressed and the throttle fully opened, the torque upon the propeller or load is built up to its maximum for accelerating the vehicle or for climbing steep grades, and reaches its maximum when the vehicle is kept from moving, as when it is stalled or the brakes are set. During this condition of operation the engine speed has increased to the point where its power output is sufficient to take care of the losses in the transmission. The booster brush shifting motor BS is provided with a field coil 52, which will hereafter also be referred to as a speed coil. The coil 52 has one of its terminals connected with the junction point of the booster brush 15 and the series coil 13, and has its other lead connected with the third brush of the car generator 54 through the contacts cc of the accelerator switch A and a thermostat T, the purpose of which will hereafter be described. It is well known that the potential with which the field coil of a third brush generator is supplied builds up rapidly at a relatively low speed and diminishes after a predetermined speed has been reached and the cut-out switch connecting the battery with the generator has closed. However, the voltage between the third brush and the main brush, other than the one to which the field terminal is connected, increases with the speed of the generator and engine, even after the circuit to the battery has been closed. A preferred embodiment of my system makes use of this characteristic of the third brush generator to charge a battery and supply the lights and ignition circuit of the vehicle with current at an approximately constant voltage, and at the same time to supply a varying potential and current to the speed coil 52 which operates so that an increase in engine speed will increase the torque of the booster brush shift motor BS with respect to the spring 25 and tend to shift the booster brushes in a direction opposed to engine rotation as the engine speed increases. It will be seen, however, that the current in coil 52 is also varied and governed by the variations of the load current in, and the potential drop across, the series field coil 13 which operates so that an increase in the load current will reduce current through coil 52, thus weakening the motor torque of the brush shifter BS and causing the spring 25 to move the brushes in the direction of engine rotation. It will be seen that where an extreme range of automatic regulation is desired the potential drop in coil 13 may be made to nearly equal the potential developed by the regulating generator 54, when, at maximum load the booster brushes will be held in motoring position and at very light loads will be moved into and held in full generating position. The control connections for the entire range are established by a slight depression of the accelerator pedal 43, as shown in Fig. 4 and Fig. 5, for underdriving and overdriving respectively. The entire range between the two extremes is secured and determined by variations in the position of the accelerator pedal 43 and the engine throttle 2, as well as by the speed of the engine and the corresponding speed of the load shaft and vehicle.

It should be noted that in some instances it may be desirable to provide a small generator connected to be driven from the load shaft for the purpose of supplying current to the speed responsive coil 52, in place of the connection to the third brush of the car generator heretofore described, in order to secure regulation responsive to variation in the speed of the load shaft, and in order to secure better cooperation between the regulator voltage and the voltage drop in one of the series coils of the main units and so improve the responsiveness to load current variations which may result therefrom. This arrangement is illustrated in Fig. 13 in which the generator 65 is shown connected to be driven from the load shaft and supplies current to the speed responsive coil 52 in place of the connection to the third brush of the car generator. This figure is in other respects identical with Fig. 5 and shows the connections and brush positions of the system during the stage when the system operates with high load speed and moderate engine speed.

I may also provide a coil 53, which will hereafter also be referred to as the load coil, connected preferably across both series field coils 13 and 14, to be supplied with a current which varies according to the current in the load circuit and potential drop in the series coils 13 and 14. The coil 53 is connected to oppose the current in coil 40 during forward operation, weaken the field and torque of the booster brush shift motor BS with respect to the spring 25, so that an increase in the load current will tend to move the brushes in the direction of engine rotation towards motoring position, and a decrease in the load current will tend to shift the booster brushes in opposition to engine rotation towards generator position. The load coil 53 is particularly useful when the voltage drop in the series coil 13 is relatively low with respect to the voltage of the regulating generator 54 and insufficient to provide the desired load responsive regulation. In instances where the potential drop in coil 13 is sufficient to provide the desired regulation, the coil 53 may be omitted. Where coil 53 is employed, coil 52 need not be connected to respond to load current variations, but may be connected directly to the generator 54, or to a regulator generator driven by the load shaft, in which case it would act solely as a speed coil.

*Forward maximum power*

The force of the spring 25 is preferably selected so as to considerably exceed that necessary to overcome the friction of the brushes against the commutator as well as the friction in the brush shifting mechanism. However, the presence of friction causes the brushes to lag, for a given balance of the forces of the spring and the booster brush shift motor, and causes them to assume a position away from the direction of engine rotation when the spring 25 operates, and to lag towards the direction of engine rotation when the motor force is operative, from the position which they would assume if friction were not present. In order to compensate for this condition I provide means for varying the force opposed to the booster brush shift motor BS in response to a change in the position of the accelerator pedal 43. This may be accomplished by varying the tension of the spring 25 directly, or by a separate spring 55 shown in Fig. 1 which may be arranged or adjusted to be compressed by depression of the accelerator pedal 43, either simultaneously with an increase in the throttle opening or after the throttle has fully opened, which is made possible by the provision of the spring 56 which permits rod 49 to separate and move with the accelerator pedal 43 after the throttle is fully opened. In instances where a positive movement of the booster brush in direction of engine rotation is desired by movement of the accelerator pedal beyond full open throttle position, I provide a rod 57 and preferably a switch or carbon pile 58 interposed between the accelerator and brush shift mechanisms; the function of the latter being to weaken the force of the booster brush shifter BS, as by shunting current away from it, and so reduce the pressure that the operator need exert upon the accelerator pedal 43 whenever he wishes to force movement of the booster brushes in the direction of engine rotation to increase the speed and power output of the engine. The elements 55, 57 and 58 may be used singly, or in combination with one another, or not at all, depending upon the modification of the brush shift desired. The change in the booster brush position which may thus be effected has been shown in Fig. 6 where for the sake of illustration, the booster brushes have been shown in a generating position within 10° of the neutral, while the control connections, aside from the shunting device 58 have remained the same.

Forward braking

My system provides for the braking of the load shaft or vehicle with the engine friction by merely releasing the accelerator pedal 43, and pressure of the spring 38 operates the accelerator switch A so as to open contacts c—c and d—d and to close contacts r—r and b—b. This disconnects the field coil 52 from the regulator 54 and also disconnects both brush shift motors from the battery. The spring 25 quickly moves the booster brushes into their motoring position and the spring 27 moves the clutch brushes in the direction opposite to engine rotation and into generating position now that the clutch armature rotates in the direction of engine rotation. Immediately after the clutch brushes begin their movement, the valve stem 30 closes and the pressure built up in the cylinder 28 serves to reduce the speed of movement of the clutch brushes to a slow rate as they pass the neutral position and move into generating position, which prevents any too sudden building up of current in the load circuit and shock to the system. Current from the clutch flows through the booster, which with the brushes in motoring position exerts a torque upon the engine in the direction of its rotation, and a counter-potential develops in the booster which serves to further limit current in the load circuit and prevent shock. It is sometimes desirable to further limit the building up of current during braking, and for this purpose I provide contacts b—b on switch A so that when the accelerator is released, the drop of potential in one of the series field coils, for instance the coil 13, is impressed on the booster brush motor BS in such a way as to shift the booster brushes into the direction of engine rotation against the force of the spring 26, by means of which the booster counter-potential and its motor torque in the direction of engine rotation may be substantially increased whenever the current in the load circuit becomes excessive. This serves to relieve the gear train G from momentary excessive loads.

Increased braking

My system also provides for increasing the effectiveness of braking by means of engine friction and this is accomplished by reducing and varying the booster counter potential by some means, such as a switch, or a carbon pile B', connected across the booster and arranged to be compressed by any suitable means such as the button 59 which may be located at any point within easy reach of the operator but which preferably is arranged in a position requiring the operator to remove his foot from the accelerator pedal 43, and establish normal braking conditions heretofore described, before pressing the button 59 to increase braking. The reduction of the booster counter potential in this manner increases the current in the load circuit, forces the clutch armature 12 to slow down so that for any given speed of the load shaft or vehicle the engine is forced to rotate at a speed exceeding that of the load shaft by reason of the gear train G interposed between the shafts, the increased power required to turn the engine at the higher speed serving to decelerate the vehicle and to hold it on steep grades without necessarily resorting to the vehicle brakes. In my copending application Serial No. 649,636 filed December 30, 1932, I have described the manner in which friction braking can be increased by shunting the booster field. In the present system it is important that the booster counter potential be reduced and varied by shunting the current away from both the armature and the field of the booster unit, for the reason that any unbalancing between the field and armature currents will result in objectionable sparking at the commutator. The connections and brush positions during this stage of operation are shown in Fig. 8.

Forward free running

Whenever, during motion of the car, the accelerator is slightly depressed without necessarily increasing the throttle opening, but sufficient to operate the accelerator switch A, so as to open contacts r—r and b—b and to close contacts c—c and d—d, the connections shown in Fig. 9 are established. The control motors move the clutch and booster brushes into their forward operating positions shown, but since the engine at this moment either idles or rotates at a low speed, the forward moving vehicle drives the clutch armature 12 through the gear train G at a speed which prevents current flow in the load circuit. Consequently the vehicle and load shaft may freely overrun the engine without being impeded by engine friction or drag.

Neutral

When the control button 32 is moved to the neutral position N, the contacts N—N of the control switch H are open circuited and the battery circuit remains interrupted regardless of whether the accelerator pedal is released or depressed, establishing the connections and brush positions shown in Fig. 10. With the control in this position the engine may be run and the accelerator mechanism manipulated, when warming up the engine or adjusting the carburetor, without the possibility or danger of starting the car. In cold weather or whenever the battery has run down to the point where it will fail to start the engine, my system makes it possible to start the engine by towing the car. This may be done with the controller in forward position when the accelerator is released or by moving the controller into the neutral position when the accelerator and throttle may be manipulated so as to facilitate starting of the engine. In either of the two control positions the clutch and booster brushes are spring held in their respective positions and are such that the rotation of the clutch armature by the motion of the vehicle through the gear train G is in direction of engine rotation, causing it to generate current, the reaction produced thereby through the gearing forcing the engine to rotate in the proper direction. The current from the clutch traverses the booster, with its brushes at this moment in motoring position and causes the booster to operate as a motor and to aid in rotating the engine.

*Reverse*

To reverse the vehicle or load shaft the controller is moved into the reverse position R, where contacts F—F, S—S, and B—B are open and contacts R—R and N—N of the control switch H are closed, thus establishing the connections shown in Fig. 12, in which the clutch brush shifter CS is short-circuited so that the brushes remain in their spring held position. The full battery potential is impressed across the terminals of the booster brush shift motor BS, the increased torque developed by the shifter BS very quickly moving the booster brushes over into full generating position and firmly maintaining them in this position during reverse operation. As heretofore mentioned, the booster unit is relatively physically larger than the clutch unit. This relationship is essential for the production of a powerful reverse torque, especially when the booster is directly connected to the engine and is operated at engine speed, inasmuch as it must be able to absorb the full engine torque in addition to the torque imposed upon it by the reversely driving clutch armature through the gear train G, and must under this condition of operation generate a potential sufficiently high to balance the counter potential of the clutch motor rotating at a relatively higher speed, as well as supply the voltage component required to force the current through the load circuit. The conditions governing the production of a powerful reverse torque have been described at length in my copending application, Serial No. 508,094, filed January 12, 1931. It should be noted that in instances where the force of the retractile means for the booster brush is varied or increased in response to a change in the position of the accelerator pedal 43, as by the spring 55 heretofore described in connection with forward operation, the increased torque developed by the booster brush shift motor BS during reverse operation is important as it prevents the extra force that may be developed by the spring 55 from moving the booster brushes out of their full generating position. In instances where the force of the motor BS is insufficient to hold the brushes in full generating position or where any unyielding connection between the accelerator pedal 43 and the brush shift mechanism is used, such as the rod 57, to move the brushes in the direction of engine rotation beyond the point of full throttle position, I provide means for preventing the movement of the booster brushes away from their full generating position and preventing the movement of the throttle lever beyond full open throttle position such as a pawl 60, which when the control is in reverse, assumes the position shown by the dotted line, limits the movement of the accelerator pedal and prevents the booster brushes from being forced out of their full generating position.

I provide means for compensating the effect which a change in temperature has upon the automatic regulation of the system. This means may conveniently take the form of a thermostat T shown in Fig. 1 comprising a variable resistance such as the carbon pile 61 arranged to be compressed by a bi-metal strip 62 which when enclosed within one of the elements of the transmission and subjected to its temperature will flex and exert a varying pressure upon the carbon pile 61 as the temperature varies. The thermostat may be included in one of the control circuits such as the field coil 52 when the thermostat is so arranged that an increase in the temperature will lower the resistance of the control circuit in which the thermostat is included. It may further be so adjusted that it will not only compensate for the resistance increase of the circuit in which it is included but so that it will also compensate for any increase in the resistance of the other circuits such as the control motor armature and their main fields, in order to maintain especially the torque of the booster brush motor BS the same for any given condition of operation even though the temperature varies. Furthermore, the thermostat may be made use of to overcompensate, that is, to strengthen the control motor BS as the temperature of the system rises. This will operate to hold the booster brushes further towards the extreme generating position, reduce the engine speed, power output, and current in the load circuit, and so tend to prevent an excessive temperature rise in the transmission apparatus.

From the foregoing it will be seen that my system when applied to a motor vehicle greatly simplifies its operation. After the engine has been started as heretofore described, power can be applied and the car started in forward and reverse directions, depending upon the position of the control switch, by a slight depression of the accelerator. The speed of the engine can be varied with respect to the propeller shaft; the engine speed can be increased with respect to the load shaft speed for vigorous acceleration, or for climbing a grade, by merely depressing the accelerator, and the speed of the engine can be greatly reduced with respect to the load shaft speed for maximum economy on a level road, or on a slight downward grade, by a mere release of the accelerator pedal. The car can be made to free wheel, or the engine may be engaged for engine friction braking, as desired, and the change from one to the other condition is brought about instantaneously as needed or desired by only a slight movement of the accelerator pedal and without the aid of other controls, and, in an emergency, the engine can be started by towing the car at a moderate speed. The system provides for other features such as the adjustment of the engine idling speed apart from the accelerator pedal, in order that the manipulation of the accelerator pedal may be confined to the application of power and the control of the car and engine under various operating conditions. It provides for safety features such as the arrangement which prevents starting of the engine from the battery unless the accelerator is in the released position in order that the car may not start after the engine has been set in operation and until after the operator is ready and depresses the accelerator.

When the system is first put in use, or after it has been out of use for a time, the residual magnetism in the booster and clutch field elements may not be sufficient to permit the current in the load circuit to build up at a low engine speed. In order to meet this condition and to insure smooth and unfailing building up of current, I provide means for establishing and maintaining a slight magnetization in the booster and clutch field elements consisting of a relatively small coil 63 on the booster field element and a second small coil 64 arranged on the field element of the clutch unit which are preferably connected to receive a slight magnetizing or teasing current from the battery 39 or generator 54 whenever the accelerator is slightly depressed and the contacts d—d are closed and with the control switch H in forward or reverse positions. The teaser coils 63 and 64 are connected so that they will establish a slight magneto-motive-force in the field elements in the same direction as that established by the series field coils 13 and 14 respectively when load current flows therein. With this arrangement the system will build up in the same direction irrespective of whether the clutch or the booster operates as the generator, the building up of the system being determined by the position of the brushes and the predomination in speed and voltage of one machine induced by the teaser magnetization therein over the opposing voltage induced by the teaser magnetization in the other machine, which insures a uni-directional building up of current in the load circuit under all conditions of operation. In the arrangement shown, the circuit of coils 63 and 64 is opened and closed by the accelerator switch but, if desired, this circuit may be controlled only by switch SW so the coils would be energized so long as the engine is running. Even with this arrangement, the dynamos will not pick up when the accelerator is released and the engine is idling, since at this time the series field coils of both dynamos are connected in reverse direction for generator operation.

It will be understood that many of the features disclosed in connection with the invention are ancillary to the main system and in some cases are not essential to the fundamental mode of operation of the system, as several or all of the features may be used in a given application.

I have herein described the principle of my invention and illustrated a preferred embodiment thereof. Various modifications will occur to those skilled in the art, and I desire it to be understood that all modifications which fall within the terms of the appended claims are to be considered as falling within the scope of my invention.

What I claim is:

1. In combination, an engine having a shaft and an accelerator, a load shaft, a dynamo for coupling said shafts in variable speed relation and having shiftable brushes, a load circuit for said dynamo, means for normally biasing the brushes of said dynamo to a non-generating position when driven by the engine shaft, and means responsive to movement of said accelerator to open throttle position for shifting said brushes to generating position.

2. In combination, an engine having a shaft and an accelerator, a load shaft, a dynamo for coupling said shafts in variable speed relation and having shiftable brushes, a load circuit for said dynamo, means for normally biasing the brushes of said dynamo to a position for generator operation when driven by said load shaft in forward direction, and means responsive to movement of said accelerator to open throttle position for shifting said brushes to generating position when driven by said engine shaft, whereby said dynamo is rendered operative to transmit power from said engine shaft to said load shaft when said accelerator is in open throttle position and to transmit power from said load shaft to said engine shaft when the accelerator is in released position.

3. In combination, an engine having a shaft and an accelerator, a load shaft, a dynamo for coupling said shafts in variable speed relation and having shiftable brushes, a second dynamo connected in fixed speed relation with the engine shaft, a load circuit connecting said dynamos, the second dynamo being connected for motoring operation in the direction of engine rotation, means for normally biasing the brushes of said first dynamo to a non-generating position when driven by the engine shaft, and means responsive to movement of said accelerator to open throttle position for shifting said brushes to generating position.

4. In combination, an engine having a shaft and an accelerator, a load shaft, a dynamo for coupling said shafts in variable speed relation and having shiftable brushes, a second dynamo connected in fixed speed relation with the engine shaft, a load circuit connecting said dynamos, the second dynamo being connected for motoring operation in the direction of engine rotation, means for normally biasing the brushes of said first dynamo to a position for generator operation when driven by said load shaft in forward direction, and means responsive to movement of said accelerator to open throttle position for shifting said brushes to generating position when driven by said engine shaft, whereby said dynamo is rendered operative to transmit power from said engine shaft to said load shaft when said accelerator is in open throttle position and to transmit power from said load shaft to said engine shaft when the accelerator is in released position.

5. In combination, an engine having a shaft and an accelerator, a load shaft, a dynamo for coupling said shafts in variable speed relation and having shiftable brushes, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a non-generating position when driven by the engine shaft, means responsive to movement of said accelerator to open throttle position for shifting the brushes of the first dynamo to generating position, and means responsive to speed variations of one of the shafts for shifting the brushes of the second dynamo to generating position.

6. In combination, an engine having a shaft and an accelerator, a load shaft, a dynamo for coupling said shafts in variable speed relation and having shiftable brushes, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a position for generator operation when driven by said load shaft in forward direction, means responsive to movement of said accelerator to open throttle position for shifting the brushes of the first dynamo to generating position when driven by said engine shaft, means responsive to speed variations of one of the shafts tending to shift the brushes of the second dynamo to generating position, and means responsive to current in the load circuit tending to shift the brushes of the second dynamo to motoring position.

7. In combination, an engine having a shaft and an accelerator, a load shaft, a dynamo having shiftable brushes, a differential gearing for driving said dynamo from either shaft, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a non-generating position when driven by the engine shaft, means responsive to movement of said accelerator to open throttle position for shifting the brushes of the first dynamo to generating position, and means responsive to speed variations of the engine shaft for shifting the brushes of the second dynamo to generating position.

8. In combination, an engine having a shaft and an accelerator, a load shaft, a dynamo having shiftable brushes, a differential gearing for driving said dynamo from either shaft, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a position for generator operation when driven by said load shaft in forward direction, means responsive to movement of said accelerator to open throttle position for shifting the brushes of the first dynamo to generating position when driven by said engine shaft, means responsive to speed variations of the engine shaft tending to shift the brushes of the second dynamo to generating position, and means responsive to current in the load circuit tending to shift the brushes of the second dynamo to motoring position.

9. In combination, an engine having a shaft, a load shaft, a dynamo for coupling said shafts in variable speed relation, and having shiftable brushes, a load circuit for said dynamo, means for normally biasing said brushes to a position for generator operation when driven by said load shaft, whereby said engine may be started by driving said load shaft, and means for shifting said brushes to a position for generator operation when driven by said engine to drive said load shaft.

10. In combination, a vehicle provided with an engine having a shaft, a load shaft, a dynamo having shiftable brushes, differential gearing for driving said dynamo from either shaft, a load circuit for said dynamo, means for normally biasing said brushes to a position for generator operation when driven by said load shaft, whereby said engine may be started by towing said vehicle, and means for shifting said brushes to a position for generator operation when driven by said engine to drive said load shaft.

11. In combination, a power shaft, a load shaft, a dynamo having shiftable brushes, differential gearing for driving said dynamo from either shaft, means for normally biasing said brushes to a position for generator operation when driven by said load shaft, a second dynamo connected in fixed speed relation with the power shaft and having shiftable brushes, a load circuit connecting said dynamos, means for normally biasing the brushes of the second dynamo to a position for weakened motoring operation in the direction of power rotation, and means responsive to increase in load current for shifting the brushes of the second dynamo to stronger motoring position.

12. In combination, an engine having a shaft and an accelerator, a load shaft, a dynamo for coupling said shafts in variable speed relation and having shiftable brushes, means for normally biasing said brushes to a position for generator operation when driven by said load shaft, a second dynamo connected in fixed speed relation with the engine shaft and having shiftable brushes, a load circuit connecting said dynamos, means for normally biasing the brushes of the second dynamo to a position for weakened motor operation in the direction of engine rotation, means responsive to movement of the accelerator towards open throttle position to shift the brushes of the first dynamo for generator operation when driven by the engine, and means responsive to increase in load current for shifting the brushes on the second dynamo to stronger motoring operation when said accelerator is released.

13. In combination, an engine having a shaft and an accelerator, a load shaft, a dynamo for coupling said shafts in variable speed relation and having shiftable brushes, means for normally biasing said brushes to a position for generator operation when driven by said load shaft, a second dynamo connected in fixed speed relation with the engine shaft and having shiftable brushes, a load circuit connecting said dynamos, means for normally biasing the brushes of the second dynamo to a position for weakened motor operation in the direction of engine rotation, means responsive to movement of the accelerator towards open throttle position to shift the brushes of the first dynamo for generator operation when driven by the engine, means responsive to the speed of the engine shaft for shifting the brushes of the second dynamo towards generating position, and means responsive to increase in load current for shifting the brushes on the second dynamo to stronger motoring operation when said accelerator is released.

14. In combination, an engine having a shaft and an accelerator, a load shaft, a dynamo for coupling said shafts in variable speed relation and having shiftable brushes, a load circuit for said dynamo, means responsive to movement of said accelerator towards open throttle position for shifting said brushes to a position for generator operation when driven by said engine, and means responsive to the return of said accelerator to idling position for shifting said brushes to a position for generator operation when driven by said load shaft.

15. In combination, an engine having a shaft, a load shaft, a dynamo for coupling said shafts in variable speed relation, a second dynamo physically larger than the first dynamo connected in fixed speed relation with the engine shaft and provided with shiftable brushes, a load circuit connecting said dynamos, retractile means for moving said brushes in direction of engine rotation, a stop for holding said brushes against the force of said retractile means in a position for relatively weak motor operation in one stage, and means for moving said brushes in direction of engine rotation beyond said stop to a position for relatively strong motor operation in another stage.

16. In combination, an engine having a shaft, a load shaft, a dynamo for coupling said shafts in variable speed relation, a second dynamo physically larger than the first dynamo connected in fixed speed relation with the engine shaft and provided with shiftable brushes, a load circuit connecting said dynamos, retractile means for holding the brushes of the larger dynamo in a position for weakened motor operation in the direction of engine rotation, a controller for said dynamos having forward, reverse and neutral positions, and means energized in the forward and reverse positions of said controller for shifting said brushes to full generator position.

17. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, and means responsive to movement of said accelerator to open throttle position for energizing said brush shifting means.

18. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, and means responsive to movement of said accelerator for increasing the force of said biasing means as the throttle opening increases.

19. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, and means responsive to movement of said accelerator beyond fully open throttle position for decreasing the force of said brush shifting means.

20. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, and means responsive to movement of said accelerator beyond fully open throttle position for shifting the brushes away from full generating position.

21. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, a mechanical interlock between said accelerator and said brush shifting means for moving said brushes out of full generating position when said accelerator is moved beyond full open throttle position.

22. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, a mechanical interlock between said accelerator and said brush shifting means for moving said brushes out of full generating position when said accelerator is moved beyond full open throttle position, and means responsive to movement of said accelerator beyond full open throttle position for weakening the force of said brush shifting means.

23. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, means responsive to movement of said accelerator beyond fully open throttle position for shifting the brushes away from full generating position, a controller for said dynamos having forward and reverse positions, and means for rendering ineffective said last mentioned means when said controller is in reverse position.

24. In combination, a power shaft, a load shaft, a dynamo for coupling said shafts in variable speed relation, and having shiftable brushes, a load circuit for said dynamo, means for normally biasing said brushes to a position for generator operation when driven by said load shaft, means for shifting said brushes against said biasing means to a position for motor operation, and means for retarding the return of said brushes to normal position when said brush shifting means is released.

25. In combination, an engine having a shaft and an accelerator, a load shaft, a dynamo for coupling said shafts in variable speed relation and having shiftable brushes, a load circuit for said dynamo, means for normally biasing the brushes of said dynamo to a position for generator operation when driven by said load shaft in forward direction, and means responsive to movement of said accelerator to open throttle position for shifting said brushes to generating position when driven by said engine shaft, and means for retarding the return of said brushes to the biased position when said accelerator is released.

26. In combination, an engine having a shaft and an accelerator, a load shaft, a dynamo for coupling said shafts in variable speed relation and having shiftable brushes, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a position for generator operation when driven by said load shaft in forward direction, means responsive to movement of said accelerator to open throttle position for shifting the brushes of both dynamos to generating position when driven by said engine shaft, and means rendered effective upon the release of said accelerator for returning the brushes of the second dynamo to biased position in advance of the return of the brushes of the first dynamo.

27. In combination, an engine having a shaft and an accelerator, a load shaft, a dynamo for coupling said shafts in variable speed relation and having shiftable brushes, a second dynamo connected in fixed speed relation with the engine shaft and having shiftable brushes, a load circuit connecting said dynamos, means for biasing the brushes of the second dynamo to a position for motoring operation in the direction of engine rotation, means for normally biasing the brushes of said first dynamo to a position for generator operation when driven by said load shaft in forward direction, means responsive to movement of said accelerator to open throttle position for shifting the brushes of both dynamos to generating position when driven by said engine shaft, and means for preventing shifting of the brushes of the second dynamo until the brushes of the first dynamo reach full generating position.

28. In combination, a power shaft, a load shaft, a dynamo driven by the power shaft and having shiftable brushes, a second dynamo connected with the load shaft and having shiftable brushes, a load circuit connecting said dynamos for transmitting power between the shafts, means for biasing the brushes of the first dynamo to a position for motor operation in the direction of power shaft rotation, means for biasing the brushes of the second dynamo to a position for generator operation when driven by said load shaft in forward direction, means for shifting the brushes of both dynamos to effectively reversed positions to transmit power from the power shaft to the load shaft, and means rendered effective upon the release of said brush shifting means for returning the brushes of the first dynamo to biased position in advance of the return of the brushes of the second dynamo.

29. In combination, a power shaft, a load shaft, a dynamo driven by the power shaft and having shiftable brushes, a second dynamo connected with the load shaft and having shiftable brushes, a load circuit connecting said dynamos for transmitting power between the shafts, means for biasing the brushes of the first dynamo to a position for motor operation in the direction of power shaft rotation, means for biasing the brushes of the second dynamo to a position for generator operation when driven by said load shaft in forward direction, means for shifting the brushes of the second dynamo to a position for motor operation in the direction of load shaft rotation, and means rendered effective upon the brushes of the second dynamo reaching full shifted position to shift the brushes of the first dynamo to generating position.

30. In combination, a power shaft, a load shaft, a dynamo driven by the power shaft and having shiftable brushes, a second dynamo connected with the load shaft and having shiftable brushes, a load circuit connecting said dynamos for transmitting power between the shafts, means for biasing the brushes of the first dynamo to a position for motor operation in the direction of power shaft rotation, means for biasing the brushes of the second dynamo to a position for generator operation when driven by said load shaft in forward direction, means for shifting the brushes of the second dynamo to a position for motor operation in the direction of load shaft rotation, means rendered effective upon the brushes of the second dynamo reaching full shifted position to shift the brushes of the first dynamo to generating position, and means for delaying the return of the brushes on the second dynamo until after the return of the brushes on the first upon release of said brush shifting means.

31. In combination, a dynamo having shiftable brushes, retractile means for biasing said brushes in one direction, electric means tending to shift the brushes in opposite direction and being subject to changes in resistance with changes in temperature, and temperature responsive means for compensating for said changes in resistance.

32. In combination, a power shaft, a load shaft, a series dynamo driven by said power shaft and having shiftable brushes, a series dynamo connected to said load shaft and having shiftable brushes, means for biasing the brushes of said first dynamo to a position for motor operation in the direction of power shaft rotation, means for biasing the brushes of the second dynamo to a position for generator operation when driven by said load shaft, a load circuit connecting said dynamos for transmission of power between said shafts, a separate source of current, and means for maintaining a slight magnetization in the field element of both dynamos in the same direction as the magnetization produced by the load current.

33. In combination, a power shaft, a load shaft, a dynamo driven by said shaft and having shiftable brushes, a dynamo connected to said load shaft and having shiftable brushes, a load circuit connecting said dynamos for transmission of power between said shaft, means for biasing the brushes of the first dynamo to a position for motor operation in the direction of power shaft rotation, means for biasing the brushes of the second dynamo to a position for generator operation when driven by the load shaft, a controller for said dynamos having forward and reverse positions, and means rendered effective in the forward position of said controller for shifting the brushes of the second dynamo to a position for motor operation in the direction of load shaft rotation, and means rendered effective in the reverse position of said controller for shifting the brushes of the first dynamo to a position for generator operation.

34. In combination, an engine having a shaft and an accelerator, a load shaft, a dynamo driven by said engine and having shiftable brushes, a dynamo connected to said load shaft and having shiftable brushes, a load circuit connecting said dynamos for transmission of power between said shaft, means for biasing the brushes of the first dynamo to a position for motor operation in the direction of engine rotation, means for biasing the brushes of the second dynamo to a position for generator operation when driven by the load shaft, a controller for said dynamos having forward and reverse positions, and means rendered effective in the forward position of said controller for shifting the brushes of the second dynamo to a position for motor operation in the direction of load shaft rotation, means rendered effective in the reverse position of said controller for shifting the brushes of the first dynamo to a position for generator operation, and means operable by the accelerator upon return to released position for de-energizing both of said brush-shifting means.

35. In combination, an engine having a shaft, a load shaft, a dynamo driven by said engine and having shiftable brushes, a dynamo connected to said load shaft and having shiftable brushes, a load circuit connecting said dynamos for transmission of power between said shaft, means for biasing the brushes of the first dynamo to a position for motor operation in the direction of engine rotation, means for biasing the brushes of the second dynamo to a position for generator operation when driven by the load shaft, a controller for said dynamos having forward and reverse positions, and means rendered effective in the forward position of said controller for shifting the brushes of the second dynamo to a position for motor operation in the direction of load shaft rotation and thereafter shifting the brushes of the first dynamo to generating position, and means rendered effective in the reverse position of said controller for shifting the brushes of the first dynamo to generating position while maintaining the brushes of the second dynamo in biased position.

36. In combination, an engine having a shaft, a load shaft, a dynamo driven by said engine, a dynamo connected to said load shaft and having shiftable brushes, a load circuit connecting said dynamos for transmission of power between said shaft, a controller for said dynamos having forward and reverse positions, and means rendered effective in the forward position of said controller for shifting the brushes of the second dynamo to a position for motor operation in the direction of load shaft rotation, and means rendered effective in the reverse position of said controller for shifting the brushes to a position for driving the load shaft in reverse direction.

37. In combination, an internal combustion engine, a dynamo connected to said engine and having shiftable brushes, a battery, means for shifting said brushes into a position for motoring operation in the direction of engine rotation, and means responsive to the movement of said brushes into motoring position for connecting said dynamo to said battery.

38. In combination, an internal combustion engine, a dynamo connected to said engine and having shiftable brushes, a battery, means for normally biasing said brushes to a position for weakened motor operation in the direction of engine rotation, means for shifting said brushes into a position for strong motor operation, and means responsive to the movement of said brushes into strong motoring position for connecting said dynamo to said battery.

39. In combination, an internal combustion engine having a throttle and a shaft, a load shaft, a dynamo including means for coupling said shafts, a storage battery, manually operated means having positions for forward and reverse operation of the load shaft and a position for operating the dynamo to start the engine, and a pedal operated control device for establishing power flow from engine shaft to load shaft and for opening said throttle when moved in one direction and for establishing power flow from load shaft to engine shaft when moved in the opposite direction and cooperating with said manually operated means to connect the battery to the dynamo for starting the engine only when power flow between the shafts in either direction is interrupted.

40. In combination, an engine having a shaft, a load shaft, a dynamo coupling said shafts in variable speed relation, a second dynamo connected in fixed speed relation with the engine shaft, and having shiftable brushes, a load circuit connecting said dynamos, a battery, means for shifting said brushes into a position for strong motoring operation in the direction of engine rotation, and means responsive to the movement of said brushes into shifted position for opening said load circuit and connecting the second dynamo to said battery.

41. In combination, an engine having a shaft, a load shaft, a dynamo coupling said shafts in variable speed relation, a second dynamo connected in fixed speed relation with the engine shaft and having shiftable brushes, a load circuit connecting said dynamos, a battery, means for normally biasing said brushes to a position for weakened motor operation in the direction of engine rotation, means for shifting said brushes into a position for strong motoring operation in the direction of engine rotation, and means responsive to the movement of said brushes into shifted position for opening said load circuit and connecting the second dynamo to said battery.

42. In combination, an engine having a shaft, a load shaft, a dynamo coupling said shafts in variable speed relation, a second dynamo connected in fixed speed relation with the engine shaft, a battery, a circuit controller, circuit connections in one position of said controller for driving the load shaft in forward direction by said dynamos, circuit connections in another position of said controller for driving the second dynamo from said battery to start said engine, and means for normally biasing said controller to the forward run position.

43. In combination, a power shaft, a load shaft, a dynamo for coupling said shafts in variable speed relation and having shiftable brushes, a load circuit for said dynamo, means for normally biasing the brushes of said dynamo to a position for generator operation when driven by said load shaft in forward direction, a controller, and means responsive to movement of said controller to one position for shifting said brushes to generating position when driven by said power shaft, whereby said dynamo is rendered operative to transmit power from said power shaft to said load shaft when said controller is in one position and to transmit power from said load shaft to said power shaft when the controller is in another position.

44. In combination, a power shaft, a load shaft, a dynamo having shiftable brushes, differential gearing for driving said dynamo from either shaft, a second dynamo connected in fixed speed relation with the power shaft, a load circuit connecting said dynamos, the second dynamo being connected for motoring operation in the direction of power shaft rotation, means for normally biasing the brushes of said first dynamo to a position for generator operation when driven by said load shaft in forward direction, a controller, and means responsive to movement of said controller to one position for shifting said brushes to generating position when driven by said power shaft, whereby said dynamo is rendered operative to transmit power from said power shaft to said load shaft when said controller is in one position and to transmit power from said load shaft to said power shaft when the controller is in another position.

45. In combination, an engine having a shaft and an accelerator, a load shaft, a dynamo connected in fixed speed relation with the engine shaft and having shiftable brushes, a second dynamo connected with the load shaft, a load circuit connecting said dynamos for transmitting power between said shafts, means for biasing the brushes of said first dynamo to a position for motor operation in the direction of engine rotation, means for shifting said brushes against said biasing means to a position for generator operation, means responsive to movement of said accelerator to open throttle position for energizing said brush shifting means, and means responsive to changes in temperature of said dynamo to vary the force of said brush-shifting means.

46. In combination, a power shaft, a load shaft, a dynamo driven by the power shaft and having shiftable brushes, a second dynamo connected with the load shaft, a load circuit connecting said dynamos for transmitting power between said shafts, means for biasing said brushes to a position for motor operation in the direction of power shaft rotation, electrical means responsive to the speed of the power shaft for shifting the brushes into generator position and being subject to changes in resistance with changes in temperature, and temperature responsive means for compensating for said changes in resistance.

ALFONS H. NEULAND.